United States Patent
Park

[11] Patent Number: 5,877,877
[45] Date of Patent: Mar. 2, 1999

[54] APPARATUS FOR REMEDYING ERRORS IN HEAD END MONITORING BLOCK, AND CONTROL METHOD THEREFOR

[75] Inventor: Jae-Hyung Park, Seoul, Rep. of Korea

[73] Assignee: Hyundai Electronics Ind Co., Ltd., Kyounggi-do, Rep. of Korea

[21] Appl. No.: 663,750

[22] Filed: Jun. 14, 1996

[30] Foreign Application Priority Data

Jun. 29, 1995 [KR] Rep. of Korea ................ 1995 18266

[51] Int. Cl.⁶ .................................................. H04B 10/08
[52] U.S. Cl. .............................. 359/110; 359/167; 348/6; 455/3.1
[58] Field of Search ........................... 395/200; 455/67.1, 455/611, 612, 618, 3.1; 307/64, 85, 86, 126; 364/130, 131, 132, 133; 359/110, 125, 152, 157, 167, 177; 371/5.1, 20.1; 348/6.7

[56] References Cited

U.S. PATENT DOCUMENTS

| | | | |
|---|---|---|---|
| H850 | 11/1990 | Feldman | 455/605 |
| 4,520,275 | 5/1985 | Marusik | 307/64 |
| 4,710,956 | 12/1987 | Rast | 380/20 |
| 5,654,658 | 8/1997 | Kubota et al. | 327/202 |
| 5,682,485 | 10/1997 | Farmer et al. | 395/311 |

*Primary Examiner*—Kinfe-Michael Negash
*Attorney, Agent, or Firm*—Whitham, Curtis & Whitham

[57] ABSTRACT

An apparatus for remedying errors in a head end monitoring block includes an optical transmitting section for transmitting/receiving aerial broadcasting signals and its own broadcasting signals; a host computer for controlling respective sections of a head end; a master control section for monitoring an operating state of a transmitting path of the head end and the codeck boards; a master mother section for receiving certain signals from the master control section so as to connect communication paths between the optical transmitting section, the host computer and the master control section; a slave control section for monitoring the transmission state of a relevant codeck board, and for receiving an error occurrence signal from the master control section so as to carry out the function of the master control section in place of it; and a slave mother section for receiving an error occurrence signal from the master control section so as to connect communication paths between the optical transmitting section, the host computer and the master control section. In operation, if an error occurs in the master control board, the slave control board takes over the function of the master control board to carry out the head end block monitoring task in place of it. A method for remedying errors in a head end monitoring block includes analogous steps.

7 Claims, 5 Drawing Sheets

APPARATUS FOR REMEDYING ERRORS IN HEAD END MONITORING BLOCK, AND CONTROL METHOD THEREFOR

BACKGROUND OF THE INVENTION

1. Field of the Invention

The present invention relates to an apparatus for remedying errors in a head end monitoring block and a control method therefor. Particularly, the present invention relates to an apparatus and a method for remedying errors in a head end monitoring block, in which if an error occurs in a master control board monitoring the head end block in a network of multi-point topology, and thus, if a monitoring function cannot be carried out, then a slave control board takes over the function of the master control board.

2. Description of the Prior Art

Generally, as disclosed in U.S. Pat. No. 4,710,956, in an optic cable TV, there is installed a head end by which television signals or other broadcasting signals received through an antenna are transmitted to a transmission line, and to which all signals from upstream are focused in the case of a bilateral system.

FIG. 1 illustrates the constitution of the general head end. As shown in this drawing, an optical transmitting section 1 converts optical signals such as aerial broadcasting signals and self broadcasting signals into electrical signals, and converts electrical signals into optical signals, so as to carry out transmission and receiving. A host computer 2 controls the respective sections of the head end. A master control board 3 monitors the state of the transmission line of the head end and the operating state of a relevant codeck board. A slave control board 4 monitors the transmission state of the relevant codeck boards. The monitoring environmental block self-monitors the head end so as to detect errors occurred in the respective sections, and to control them depending on the need.

However, in the conventional monitoring environmental block, the master control board is connected to the optical transmitting section and to the host computer, so as to carry out the transmission and receiving of information and so as to monitor. In this condition, if an error occurs in the master control board to disable the master control board, then the communications to and from the host computer are disconnected, and consequently, broadcasting signals cannot be transmitted to the respective home terminals.

SUMMARY OF THE INVENTION

The present invention is intended to overcome the above described disadvantage of the conventional technique.

Therefore it is the object of the present invention to provide an apparatus and a method for remedying errors in a head end monitoring block, in which if an error occurs in a master control board, then a slave control board takes over the function of the master control board, so that a communication disconnection due to the error would not occur.

In achieving the above object, the present invention is characterized in that, upon receiving an error occurrence signal from a master control board, a communication path is connected between an optical transmitting line, a host computer and a master control board. Thus, in a network of multi-point topology, if an error occurs in the master control board which monitors the head end block, and thus, if the master control board cannot perform the monitoring function, then a slave control board carries out the function of the master control board in place of it.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
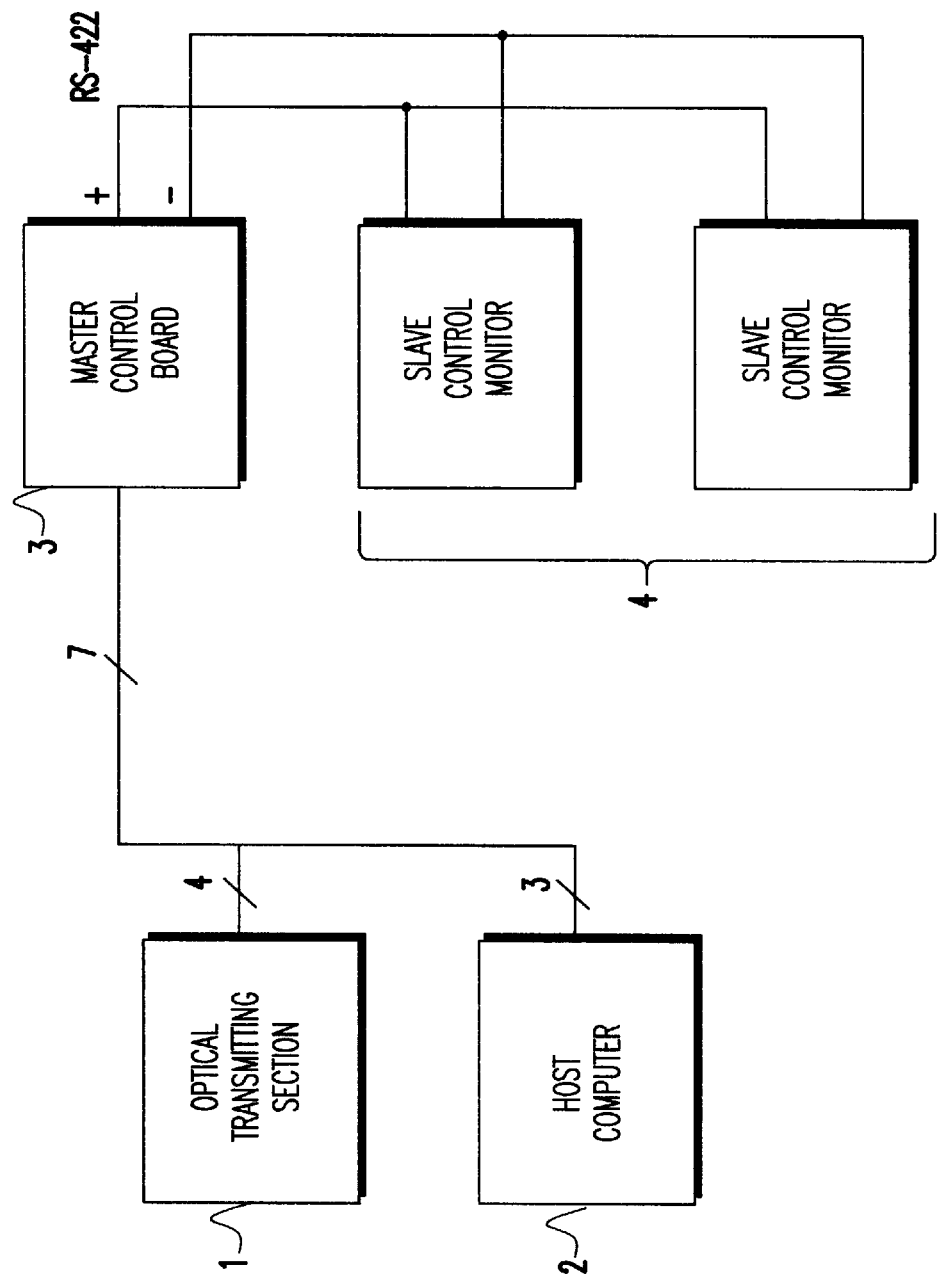
FIG. 1 is a block diagram showing the constitution of the general head end.
Figure 2:
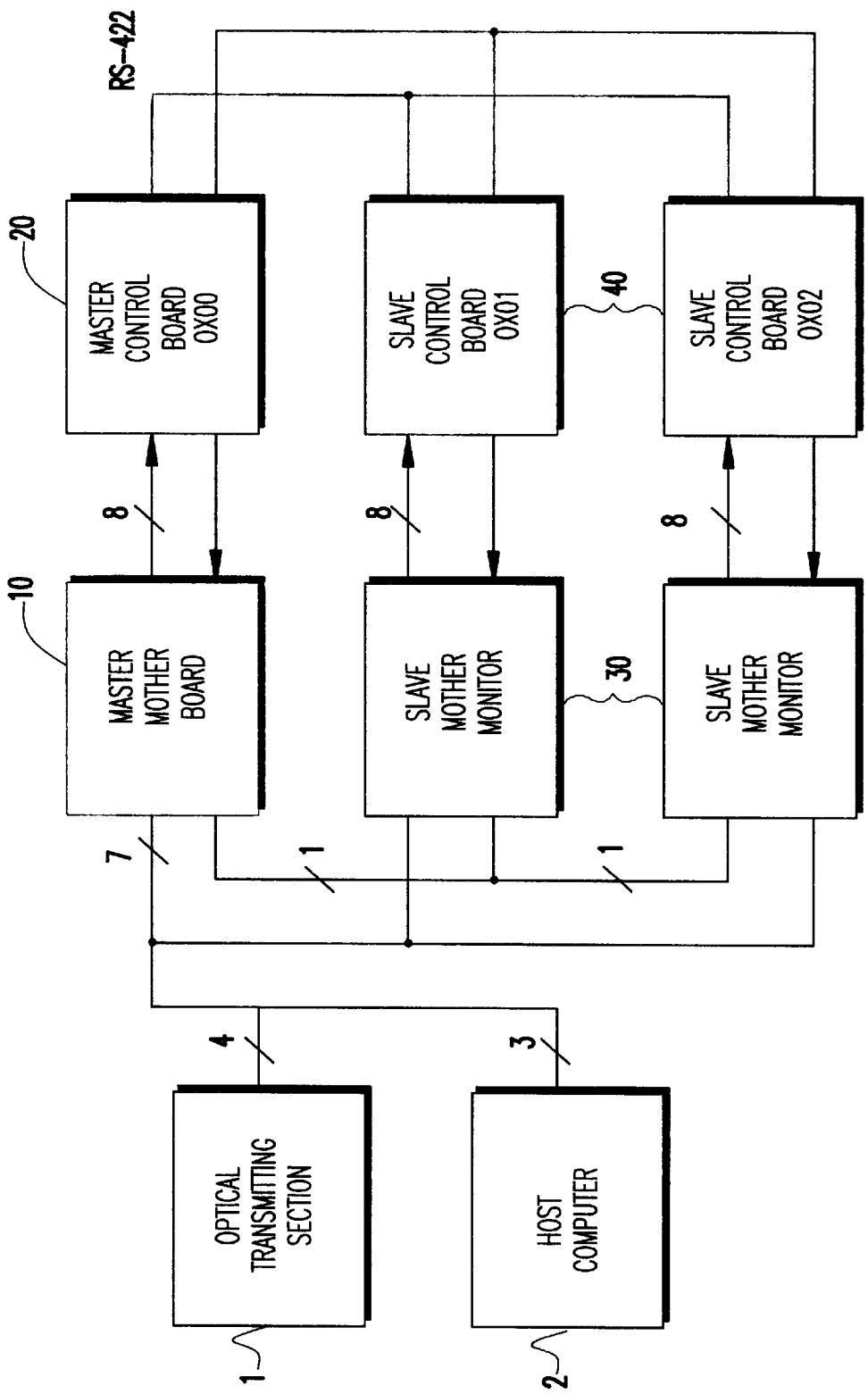
FIG. 2 is a block diagram showing the constitution of the head end according to the present invention.

FIG. 2 is a block diagram showing the constitution of the head end according to the present invention.

Descriptions on an optical transmitting section 1 and a host computer 2 will be skipped because they perform the functions same as those of the conventional ones.

A master mother board 10 and a master control board 20 monitor the operating state of the transmitting path of the head end and codeck boards. A slave mother board 30 and a slave control board 40 monitor the transmission state of a relevant one of the codeck boards.

Figure 3:
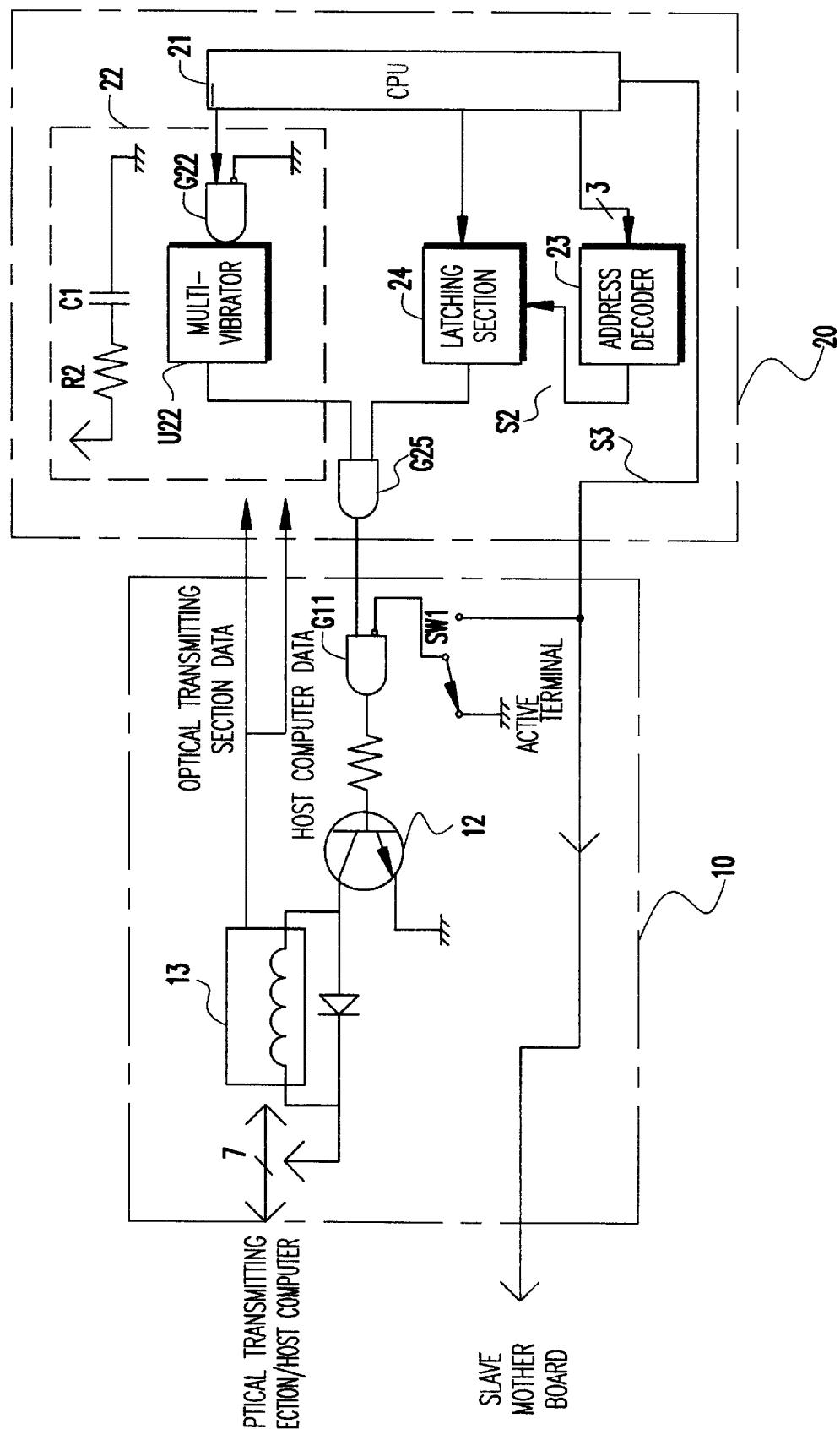
FIG. 3 is a circuital illustration of a master mother board and a master control board for carrying out monitoring functions.
Figure 4:
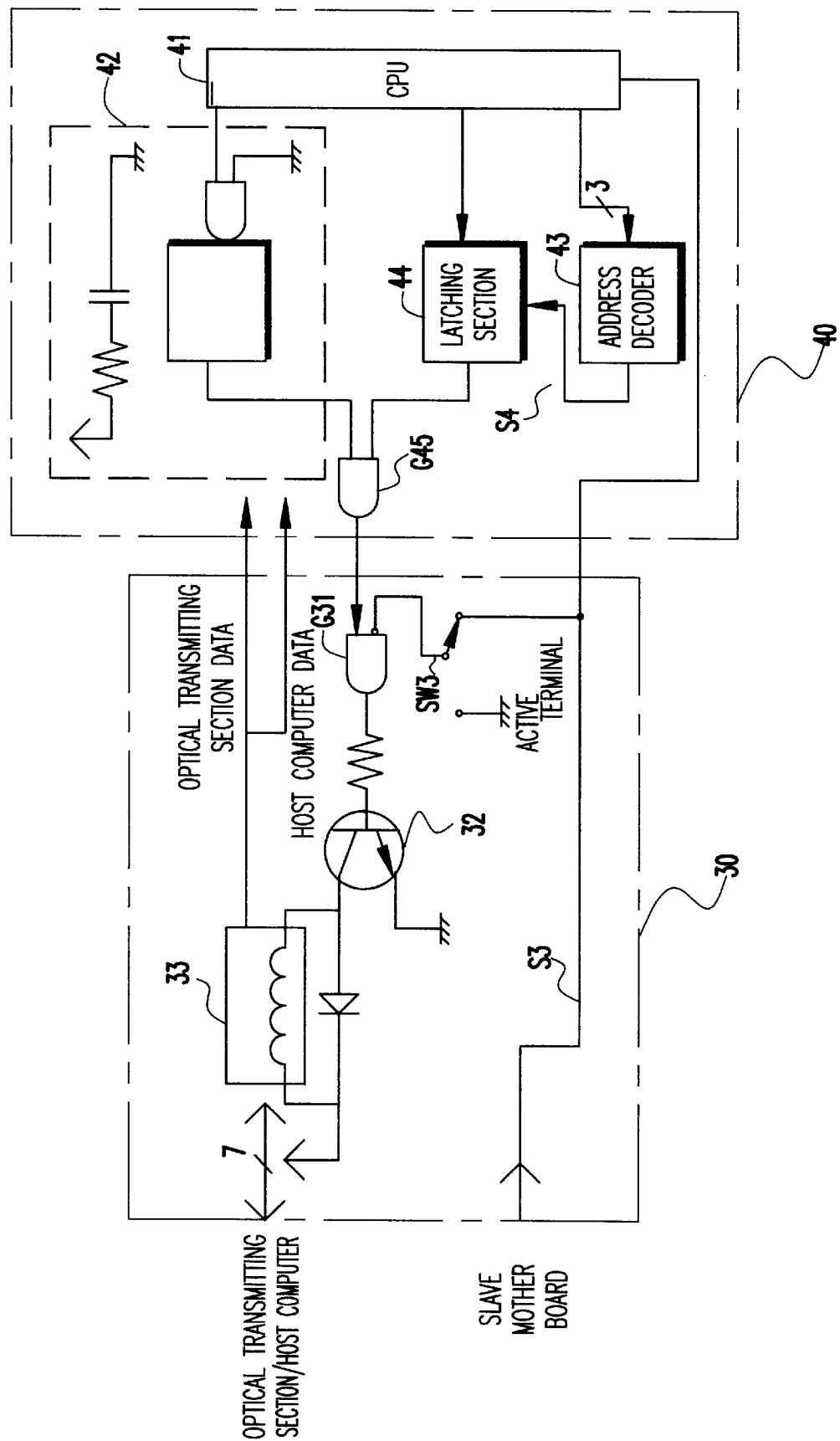
FIG. 4 is a circuital illustration of a slave mother board and a slave control board for carrying out monitoring functions.

FIGS. 3 and 4 illustrate in detail the circuits for monitoring according to the present invention. The master mother board 10 includes: a switch SW1 for selecting a signal S3 outputted from between the ground and a central processing unit 21 of the master control board 20; an AND gate G11 for carrying out AND-arithmetic operations on the output of the switch SW1 and the output signals of the master control board 20; a transistor 12 for carrying out switchings in accordance with the output of the AND gate G11; and a relay 13 for receiving power upon turning-on of the transistor so as to connect a communication path between the optical transmitting section 1, the host computer 2 and the master control board 20.

The master control board 20 includes: the central processing unit 21 monitoring the operating state of the transmission path of the head end and the relevant codeck board; a signal detecting section 22 for generating signals in accordance with the period of pulse signals from an address strobe AS of the central processing unit 21; an address decoder 23 for decoding the addresses from the central processing unit 21 so as to generate master enabling signals S2; a latching section 24 for outputting the data of the central processing unit 21 in accordance with the master enabling signals of the address decoder 23; and an AND gate G25 for carrying AND-arithmetic operations on the signals of the latching section 24 and the signal detecting section 22 so as to supply the arithmetic product to the master mother board 10.

The slave mother board 30 includes: a switch SW3 for selecting the output signals S3 of the central processing unit 21 of the master control board 20; an AND gate G31 for carrying out AND-arithmetic operations on the output of the switch SW1 and the output of the slave control board 40; a transistor 32 for being switched in accordance with the AND gate G11; and a relay 33 for connecting the optical transmitting section 1, the host computer 2 and the slave control board 40 by receiving power in accordance with the switching actuations of the transistor 12.

The slave control board 40 includes a central processing unit 41 for monitoring the operating state of the relevant codeck board; a signal detecting section 42 for outputting signals in accordance with the period of pulse signals outputted from an address strobe AS of the central processing unit 41; an address decoder 43 for decoding the addresses of the central processing unit so as to output master enable signals S4; a latching section 44 for outputting the data of the central processing unit 41 in accordance with the master enable signals of the address decoder 43; and an AND gate G45 for carrying out AND arithmetic operations on the signals of the signal detecting section and on the signals of the latching section 44 so as to output them to the slave mother board.

During the normal operation, the central processing unit 21 of the master control board 20 generates pulse signals of a certain period from its address strobe terminal AS. These pulse signals are inputted into the signal detecting section, and are made to undergo an AND-arithmetic operation by the AND gate G22, one end of the AND gate G22 being connected to "1". Then the processed results are inputted into a monostable multivibrator U22. The monostable multivibrator U22 is charged and discharged in accordance with time constants of a resistor R2 and a capacitor C1 so as to output pulse signals or "1" signals. Under this condition, the time constants of the resistor R2 and the capacitor C1 are set such that the monostable multivibrator U22 should output "1" signals during the normal operation of the central processing unit 21. The output signals of the monostable multivibrator U22 are inputted into a terminal of the AND gate G25.

Meanwhile, of the address signals which are outputted from the central processing unit 21, three bits are decoded by the address decoder 23, while "1" signals are outputted during the operation of the master control board 20. The output of the address decoder 23 is inputted into the latching section 24, and thus, output signals DO of the central processing unit 21 which are supplied to an input terminal D are outputted to the AND gate G25.

The AND gate G25 carries out an AND-arithmetic operation on the output of the signal detecting section 22 and the output of the latching section 24, and outputs the operated results to the AND gate G11 of the master mother board 10. One input terminal of the AND gate G11 is grounded by the switch SW1 so as to receive "1" signals, and therefore, outputs "0" or "1" signals in accordance with the output of the AND gate G25 of the master control board 20.

During the normal operation of the master control board 20, the AND gate G25 outputs "1" signals, and therefore, the AND gate G11 turns on the transistor 12 so as to turn on the relay 13. In accordance with the turning-on of the relay 13, data transmitting and receiving connections are formed between the optical transmitting section 1, the host computer 2 and the master control board 20.

The output signals "1" of the central processing unit 21 are supplied through the master mother board 10 to the switch SW3 of the slave mother board 30 and to the central processing unit 41 of the slave control board 40.

Further, during the normal operation of the slave control board 40, as described on the master control board 20, even if the AND gate G45 outputs "1" signals to the AND gate G31 by the functions of the signal detecting section 42, of the decoder 43 and of the latching section 44, one input of the AND gate G31 receives "1" signals from the central processing unit 21 of the master control board 20 through the switch SW3. Thus the AND gate G31 outputs "0" signals, with the result that the transistor 32 is turned off. Consequently, the relay 33 is turned off, and the slave control board 40 disconnects the communication path between the optical transmitting section 1 and the host computer 2.

If an error occurs in the central processing unit 21 of the master control board 20, the address strobe terminal AS does not output pulse signals having a certain period. Since the pulse signals are not inputted into the signal detecting section 22, the monostable multivibrator U22 outputs "0" signals. The output signals "0" of the monostable multivibrator U22 are inputted into an input terminal of the AND gate G25. Accordingly the AND gate G25 outputs "0" signals, and the AND gate G11 receives the "0" signals to output the same "0" signals.

The "0" signal of the AND gate G11 turns off the transistor 12, so that the relay would be turned off. As a result of the turning-off of the relay, the communication paths are disconnected between the optical transmitting section 1, the host computer 2 and the master control board 20. The central processing unit 21 supplies its output signals "0" through the master mother board 10 to the switch SW3 of the slave mother board 30 and to the central processing unit 41 of the slave control board 40.

Meanwhile, during the normal operation of the slave control board 40, the AND gate G45 outputs a "1" signal to the AND gate G31, and therefore, the AND gate G31 receives "1" signals through its two input terminals from the AND gate G45 and from the switch SW3.

Therefore, the AND gate G31 outputs a "1" signal so as to turn on the transistor 32. Accordingly, the relay 33 is turned on, and communication paths are connected between the slave control board 40 and the optical transmitting section 1 and the host computer 2.

Thus the slave control board 40 with its communication path connected to both the optical transmitting section 1 and the host computer 2 monitors the transmission state of the relevant codeck board and the head end in place of the master control board.

Figure 5:
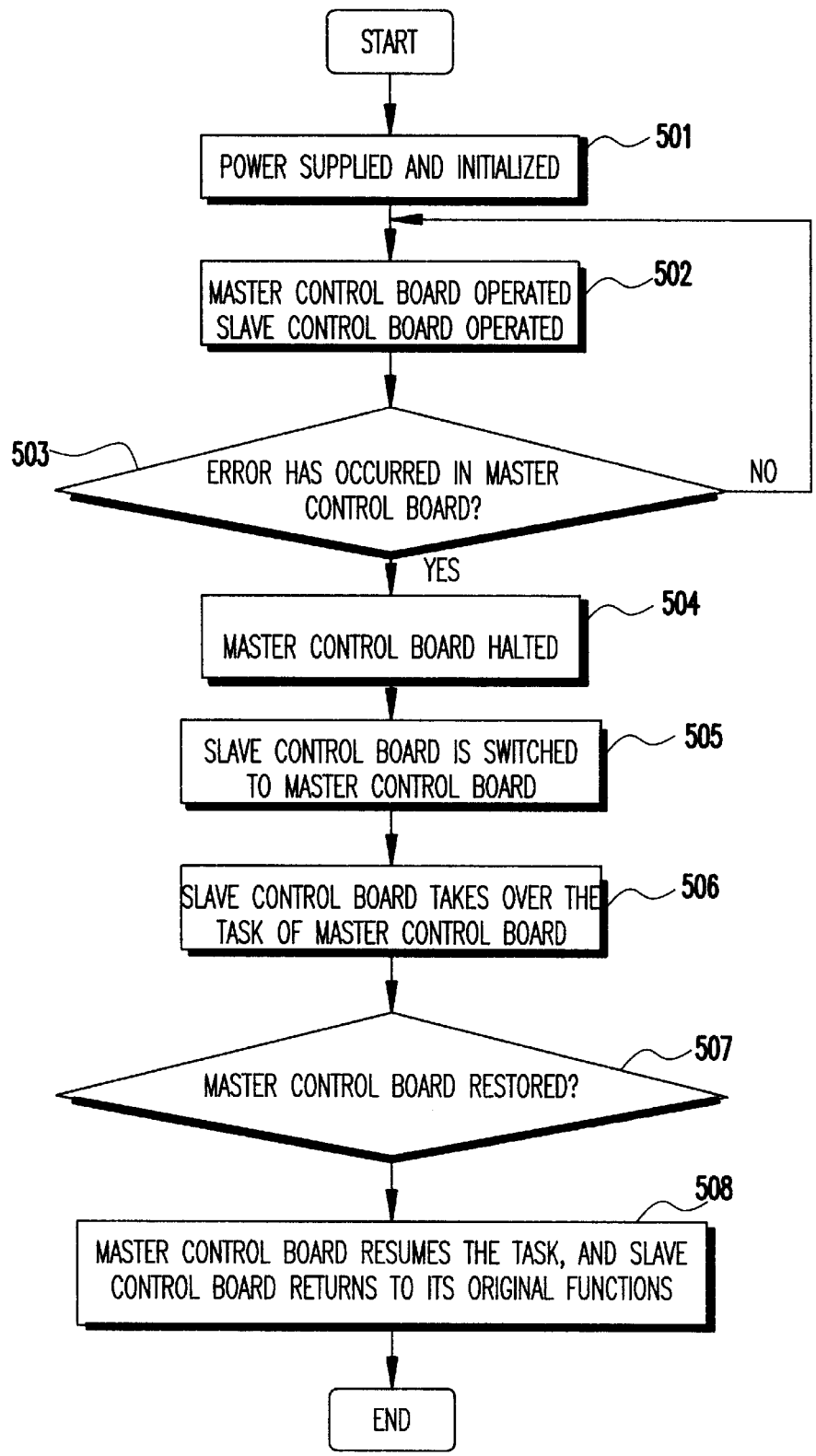
FIG. 5 is a flow chart showing the control method for remedying errors by the head end monitoring block.

FIG. 5 is a flow chart showing the control method for remedying errors by the head end monitoring block.

At a step 501, if power is supplied to the monitoring environment block, it undergoes an initializing procedure. At a step 502, the master control board 20 and the slave control board 40 are put to the normal operations, so that the respective codecks and head end can be monitored. At a step 503, a judgment is made as to whether an error has occurred in the master control board. If no error has occurred, the step 502 is repeated. If an error has occurred, the operation of the master control board 20 is stopped at a step 504. At a step 505, a value "0" is outputted to the slave mother board 30 to turn on the relay 33, so that communication paths would be connected between the optical transmitting section 1, the host computer 2 and the slave control board, and that the slave control board 40 can perform the monitoring function in place of the master control board 20. At a step 506, the slave control board 40 with its communication paths connected to both the optical transmitting section 1 and to the host computer 2 carries out the function of the master control board 20 in place of it.

If the master control board 20 is not restored to the normal state, the slave control board 40 continuously carries out the function of the master control board 20 by repeating the step 506. If the master control board 20 is restored to the normal state, communication paths are reconnected between the optical transmitting section 1, the host computer 2 and the master control board 20, so that the master control board 20 can resume the monitoring. In this case, the slave control board 40 terminates the current program so as to resume its original function.

According to the present invention as described above, even if an error occurs in the master control board of the monitoring block, the slave control board performs the function of the master control board in place of it during the remedying the error. Therefore, the monitoring function is continued without an abnormal intermission.

What is claimed is:

1. An apparatus for remedying errors in a head end monitoring block, comprising:

an optical transmitting section for transmitting/receiving broadcasting signals;

a host computer for controlling respective sections of said head end;

a master control section for monitoring an operating state of a transmitting path of said head end and a relevant one of codeck boards, and for generating error occurrence signals;

a master mother section for receiving signals from said master control section so as to connect communication paths among said optical transmitting section, said host computer, and said master control section;

a slave control section for monitoring a transmission state of a relevant codeck board, and for receiving an error occurrence signal from said master control section so as to monitor the operating state of said transmitting path of said head end in place of said master control section; and a slave mother section for receiving the error occurrence signal from said master control section so as to connect communication paths among said optical transmitting section, said host computer, and said slave control section.

2. The apparatus as claimed in claim 1, wherein said master control section and said slave control section respectively comprise:

a central processing unit for monitoring the operating state of a transmission path of said relevant one of said codeck boards and said head end, for outputting an address strobe signal during normal operation, and for outputting an error occurrence signal upon occurrence of an error;

a signal detecting section for generating signals in accordance with a period of pulse signals from an address strobe of said central processing unit;

an address decoder for decoding addresses from said central processing unit so as to generate master enabling signals;

a latching section for outputting data of said central processing unit in accordance with the master enabling signals of said address decoder; and an AND gate for carrying out AND-arithmetic operations on data output from said latching section and the signals of said signal detecting section.

3. The apparatus as claimed in claim 2, wherein said signal detecting section comprises: a monostable multivibrator, and a resistor and a capacitor for determining a time constant, whereby said signal detecting section receives address strobe signals from said central processing units of said master control section and said slave control section so as to output "1" signals.

4. The apparatus as claimed in claim 2, wherein said switch of said master mother section is connected to the ground, and said switch of said slave mother section is connected to output signals of said central processing unit of said master control section.

5. The apparatus as claimed in claim 1, wherein said master mother section and said slave mother section respectively comprise:

an AND gate for carrying out AND-arithmetic operations on a ground output and on output signals of said AND gate of said master control section;

a switch for selecting a signal for said AND gate;

a transistor for carrying out switchings in accordance with the output of said AND gate of said master control section; and a relay for receiving power upon turning-on of said transistor so as to connect said optical transmitting section, said host computer and said master control board together.

6. The apparatus as claimed in claim 1, wherein said broadcasting signals include at least one of aerial broadcasting signals and broadcasting signals of said optical transmitting section.

7. A method for remedying errors in a head end monitoring block, comprising the steps of:

supplying power to and initializing the monitoring block;

activating a master control section and a slave control section to a normal operation state, said master control section performing a monitoring task for respective codeck boards and a head end during said normal operation state;

judging whether an error has occurred in said master control section, and continuing the monitoring task upon finding no error;

halting operation of said master control section upon finding an occurrence of error and outputting a relevant signal to a slave mother section to turn on a relay so as to connect a communication path among an optical transmitting section, a host computer, and a slave control section, and so as to make said slave control section perform the monitoring task in place of said master control section;

judging whether said master control section has been restored to the normal operation state, and making said slave control section continue performing the monitoring task upon finding that said master control section has not been restored to the normal operation state; and connecting a communication path among said optical transmitting section, said host computer, and said master control section again upon finding that said master control section has been restored to the normal operation state, so as to make said master control section resume the monitoring task, and so as to make said slave control section resume said normal operation state.

* * * * *